(12) United States Patent
Hills

(10) Patent No.: US 6,373,170 B1
(45) Date of Patent: Apr. 16, 2002

(54) PIEZO-ELECTRIC MOTOR

(75) Inventor: Chris Hills, Layton, UT (US)

(73) Assignee: EDO Electro-Ceramic Products, Salt Lake City, UT (US)

(*) Notice: Subject to any disclaimer, the term of this patent is extended or adjusted under 35 U.S.C. 154(b) by 0 days.

(21) Appl. No.: 09/523,021

(22) Filed: Mar. 10, 2000

(51) Int. Cl.[7] .............................................. H01L 41/04
(52) U.S. Cl. ................................ 310/328; 310/323.18
(58) Field of Search ............................. 310/328, 323.18

(56) References Cited

U.S. PATENT DOCUMENTS

| | | | |
|---|---|---|---|
| 4,400,641 A | 8/1983 | Vishnevsky et al. | |
| 4,453,103 A | 6/1984 | Vishnevsky et al. | |
| 4,562,373 A | 12/1985 | Tokusima et al. | |
| 4,613,782 A | * 9/1986 | Mori et al. | 310/323 |
| 4,622,483 A | 11/1986 | Staufenberg, Jr. et al. | |
| 4,727,278 A | 2/1988 | Staufenberg, Jr. et al. | |
| 4,743,792 A | 5/1988 | Ueyama | |
| 4,755,705 A | 7/1988 | Holum | |
| 4,786,836 A | 11/1988 | Tokushima | |
| 4,814,660 A | 3/1989 | Yamada et al. | |
| 4,831,306 A | 5/1989 | Staufenberg, Jr. et al. | |
| 4,857,791 A | 8/1989 | Uchino et al. | |
| 4,912,351 A | 3/1990 | Takata et al. | |
| 4,933,590 A | 6/1990 | Inoue et al. | |
| 4,947,076 A | 8/1990 | Kumada | |
| 4,959,580 A | 9/1990 | Vishnevsky et al. | |
| 4,965,482 A | 10/1990 | Ohnishi et al. | |
| 4,997,177 A | * 3/1991 | Mori et al. | 271/267 |
| 5,027,028 A | 6/1991 | Skipper | |
| 5,036,245 A | 7/1991 | Ohnishi et al. | |
| 5,051,647 A | 9/1991 | Uchikawa et al. | |
| 5,087,852 A | 2/1992 | Culp | |
| 5,089,740 A | * 2/1992 | Ono | 310/328 |
| 5,144,187 A | 9/1992 | Culp | |
| 5,166,572 A | 11/1992 | Ohnishi | |
| 5,245,243 A | 9/1993 | Ohnishi et al. | |
| 5,453,653 A | 9/1995 | Zumeris | |
| 5,563,465 A | * 10/1996 | Nakahara et al. | 310/328 |
| 5,616,980 A | 4/1997 | Zumeris | |
| 5,640,063 A | 6/1997 | Zumeris et al. | |
| 5,714,833 A | 2/1998 | Zumeris | |
| 5,777,423 A | 7/1998 | Zumeris | |
| 5,780,957 A | 7/1998 | Oliver et al. | |
| 6,201,340 B1 | * 3/2001 | Matsuda et al. | 310/328 |

* cited by examiner

Primary Examiner—Thomas M. Dougherty
Assistant Examiner—Peter Medley
(74) Attorney, Agent, or Firm—Thorpe North & Western

(57) ABSTRACT

A piezoelectric motor has a head to movably engage a separate member, and one or more piezoelectric blocks coupled to the head, and displacing the head and separate member by selectively expand and contract in response to an applied electric field. An electrode extends between the head and the piezoelectric block. One or more apertures are formed in the electrode to create a space between the head and the at least one piezoelectric block to receive an adhesive to join the head and the piezoelectric block. A joint is formed between the piezoelectric block and head which has a first rigid zone to displace as the piezoelectric block expands, and a second compliant zone to comply. The electrode extends only through a portion of the joint, or the rigid zone, and the adhesive extends through at least another portion of the joint, or the compliant zone. A pre-load mechanism applies a force to the piezoelectric block and head in a linear direction oriented perpendicular to the separate member to force the head against the separate member.

32 Claims, 4 Drawing Sheets

PIEZO-ELECTRIC MOTOR

BACKGROUND OF THE INVENTION

1. The Field of the Invention

The present invention relates generally to piezoelectric motors. More particularly, the present invention relates to a piezoelectric motor having a mesh electrode, a partial electrode interface, and a pair of coil springs.

2. The Background Art

Accurate micro-positioning and actuation are often required in certain applications, such as slide positioning systems. Piezoelectric drivers have been utilized to replace leadscrews and gears typically used in such slide positioning systems. The piezoelectric drivers use a piezoelectric material to convert an electrical field applied to the piezoelectric material to mechanical displacement, or a dimensional change in the piezoelectric material. Thus, the piezoelectric material may be affixed to a first member, such as the base of a slide, and engage or bear against a second member, such as the platform of the slide. The piezoelectric material may be oriented such that the dimensional change, or expansion and contraction, of the piezoelectric material due to the applied electrical field causes the second member to move with respect to the first member.

One such example of a piezoelectric motor is disclosed in U.S. Pat. No. 4,622,483, issued Nov. 11, 1986, to Staufenberg, Jr. et al. Staufenberg, Jr. et al. discloses a pair of engaging elements which selectively clamp and translate a housing relative to a separate member. A pair of piezoelectric driving elements are each coupled to one of the engaging elements. The piezoelectric driving elements selectively expand and contract in response to an applied voltage of selected magnitude and frequency. Thus, the piezoelectric driving elements produce a variable driving force between the housing and the engaging elements, and which is conducted through the engaging elements to apply a variable clamping force to the separate member. The engaging elements are responsive to the expansion and contraction of the piezoelectric driving elements to selectively inhibit and impart relative motion between the housing and the separate member to produce motion.

Some advantages of piezoelectric motors include precise positioning (i.e. nanometer precision), efficiency, lack of backlash, and quiet operation. Despite the advantages realized by the Staufenberg, Jr. et al. motor, several disadvantages exist with such piezoelectric motors, and other commercially available motors. One disadvantage is inconsistent performance between similar motors, and individual motors. Actual motors tend to be loose, resulting in inefficient performance, inconsistent performance, and premature failure.

Another disadvantage is difficulty in manufacturing the motors. Piezoelectric motors often must be individually hand made. Thus, the manufacturing process is labor intensive and expensive. In addition, it is difficult to produce large quantities because each motor is hand made. Furthermore, it is difficult to control the manufacturing process.

Another disadvantage is tight tolerances are required. As stated above, actual motors tend to be loose, resulting in inefficient performance, inconsistent performance, and premature failure.

Another disadvantage is short life and high wear of the motors. For example, attachments between various components fail. In addition, contact points tend to wear quickly and unevenly.

SUMMARY OF THE INVENTION

It has been recognized that it would be advantageous to develop a piezoelectric motor with consistent performance for the motor itself, and consistent performance between similar motors. It would also be advantageous to develop such a motor which is more efficient, and has better performance. It would also be advantageous to develop such a motor with a longer life, and better wear characteristics. It would also be advantageous to develop such a motor which is easier and less expensive to manufacture, and which lends itself to a less labor intensive process.

The invention provides a piezoelectric motor for driving a separate member. Such a motor may be utilized for a slide having a base and a platform movably disposed on the base. The motor of the present invention may be fixed to the base of the slide, while the separate member is fixed to the platform of the base, such that the motor moves the platform on the base.

An exemplary motor includes a head to movably engage the separate member, and one or more piezoelectric blocks coupled to the head. The piezoelectric blocks selectively expand and contract in response to an applied electric field to displace the head and the separate member. An electrode extends between the head and the piezoelectric blocks to apply the electric field. In a more detailed example, the motor includes a housing fixed with respect to the separate member, and a mounting block movably connected to the housing and affixed to the piezoelectric block.

In accordance with one aspect of the present invention, one or more apertures may be formed in the electrode to create one or more spaces between the head and the piezoelectric block. An adhesive may be disposed in the spaces of the electrode between the head and the piezoelectric block to join the head and the piezoelectric block. The electrode forms a rigid structure between the piezoelectric motor and head to displace as the piezoelectric block expands and contracts, and to transfer the expansion and contraction of the piezoelectric block to the head. The electrode may include a mesh material with a plurality of openings.

In accordance with another aspect of the present invention, an interface or joint is formed between the head and the piezoelectric block which includes at least two zones, including: a first rigid zone and a second compliant zone. The electrode may extend through only a portion of the interface, forming the rigid zone. An adhesive may be disposed between another portion of the interface, forming the compliant zone. The compliant portion of one joint may comply as the other piezoelectric block expands and contracts.

In accordance with another aspect of the present invention, a pre-load mechanism may be disposed between the housing and the mounting block to apply a force to the mounting block, piezoelectric block, and head, in a linear direction oriented perpendicular to the separate member, to force the head against the separate member. The pre-load mechanism may be a pair of coiled springs on opposite sides of the head.

Additional features and advantages of the invention will be set forth in the detailed description which follows, taken in conjunction with the accompanying drawing, which together illustrate by way of example, the features of the invention.

DETAILED DESCRIPTION

Figure 1:
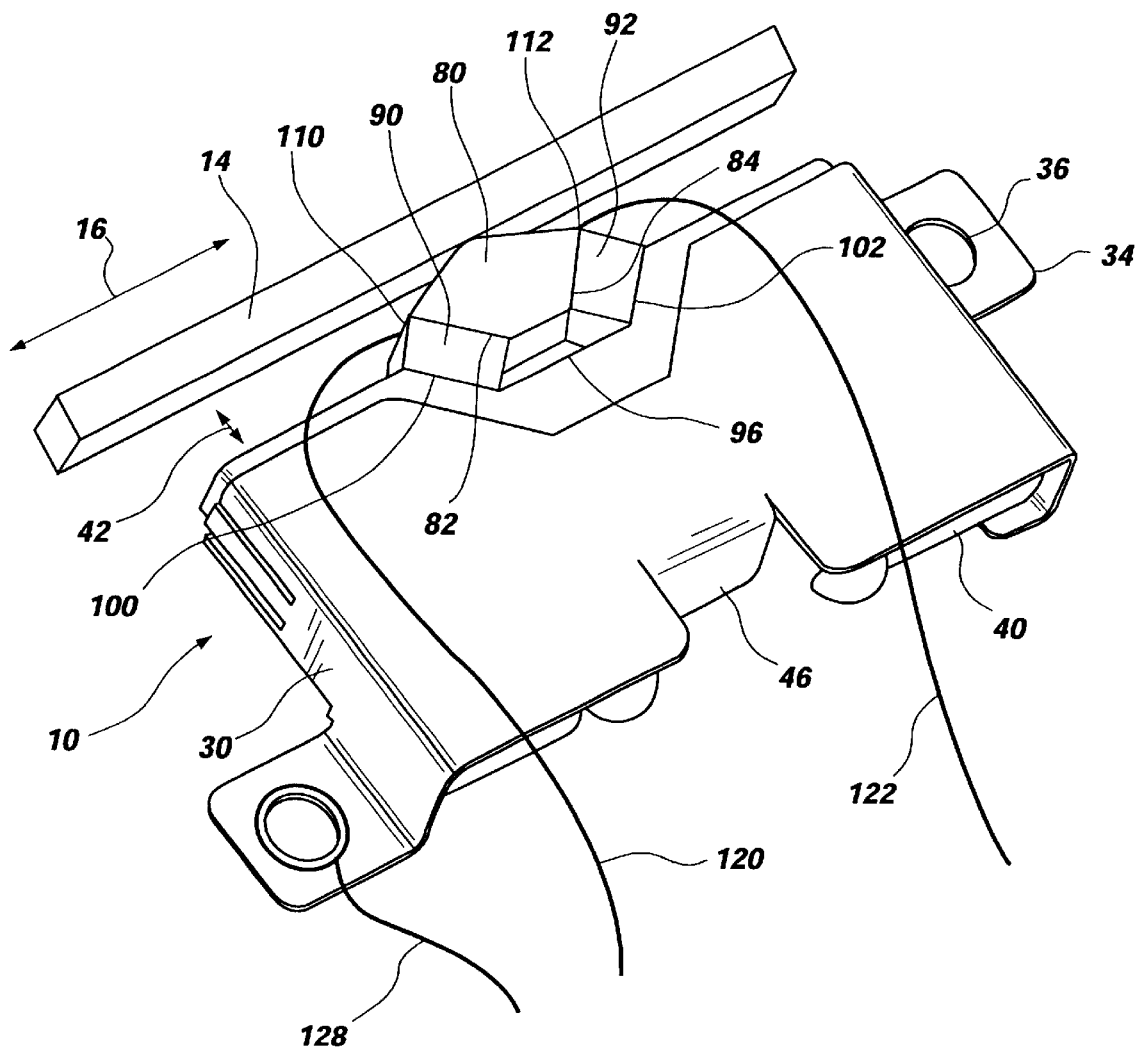
FIG. 1 is a perspective view of a piezoelectric motor in accordance with the present invention, shown driving a separate member.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 2:
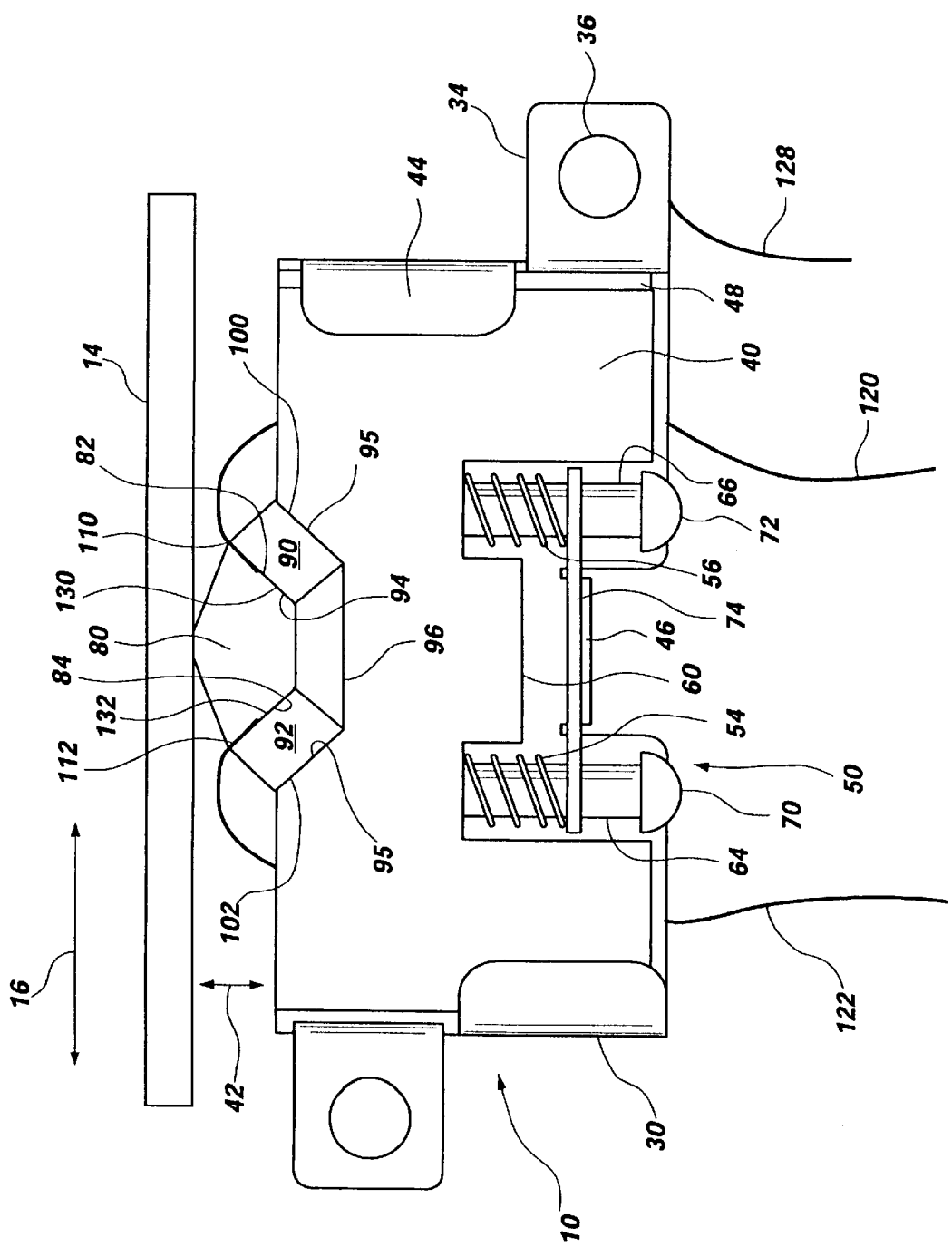
FIG. 2 is a bottom view of the piezoelectric motor in accordance with the present invention, shown driving the separate member.

As illustrated in FIGS. 1 and 2, a piezoelectric motor, indicated generally at 10, in accordance with the present invention is shown for driving a separate member, indicated generally at 14, along a path of travel, indicated by arrow 16. Micro-positioning and actuation are examples of fields which may benefit from use of such a motor 10 for imparting accurate, incremental displacement and/or force. For example, referring to FIG. 4, the motor 10 may be utilized with a slide positioning system 18 which have a fixed base 22, and a platform 26 movably disposed on the base 22. The motor 10 of the present invention may be affixed to the base 22 of such a slide 18, while the separate member 14 may be affixed to the platform 26, or vice versa, to displace the platform 26 on the base 22, indicated by arrow 28. It will be appreciated that the separate element 14 may be a separate component, or an integral component, of the object being driven, such as the slide 26. It will also be appreciated that either the motor 10 or the separate member 14 may be affixed to either a fixed object or a moving object.

Figure 4:
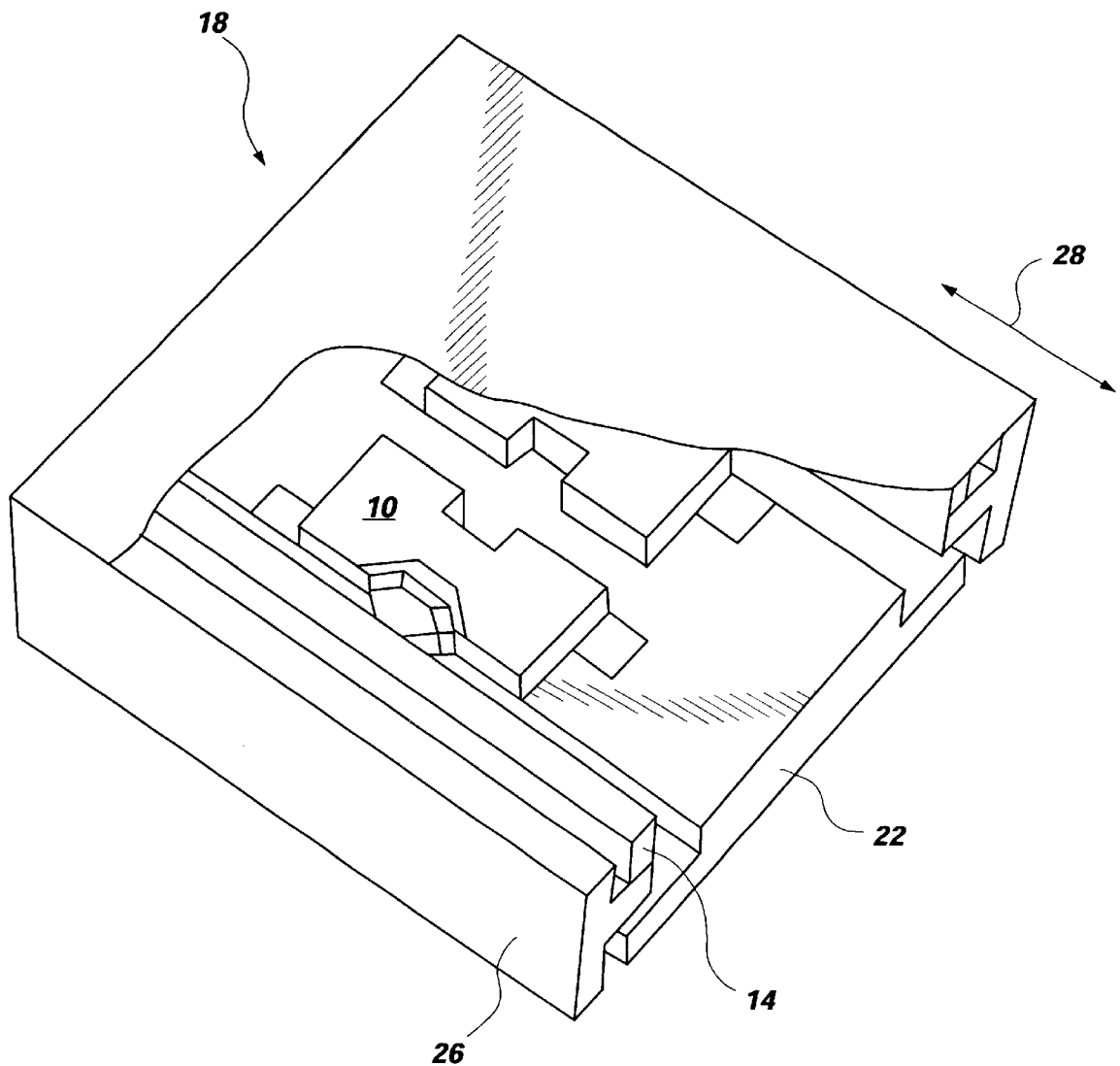
FIG. 4 is a perspective view, partially removed, of an exemplary application of a slide positioning system with the piezoelectric motor in accordance with the present invention.

Referring again to FIGS. 1 and 2, the motor 10 includes a housing 30 which is fixed with respect to the separate member 14. The housing 30 may be fixed to an object, such as the base 22 of a slide 18 as shown in FIG. 4. Thus, the housing 30 may have flanges 34 with apertures 36 to receive screws, rivets, or the like, to secure the housing 30. The housing 30 may be stamped sheet metal shaped to form the housing 30. The housing 30 is open at a side facing the separate member 14, and closed, or forming retaining flanges, at the remaining sides and ends, as discussed more fully below.

A mounting block 40 is movably disposed in the housing 30, and thus movable with respect to both the fixed object, such as the base 22 of the slide 18 in FIG. 4, and the separate member 14, indicated by arrow 42. Flanges 44 and 46 are formed in the housing 30 to retain the mounting block 40 in the housing 30. The housing 30 limits movement of the mounting block 40 to a substantially linear movement path and direction, also indicate by arrow 42, which is substantially orthogonal to the separate member 14, and the direction of travel 16 of the separate member 14. A low friction material 48 may be disposed between the mounting block 40 and housing 30 to reduce friction therebetween, and to facilitate a sliding motion.

The mounting block 40 preferably has substantial mass compared and acts as a solid base or relatively fixed mass against which the piezoelectric blocks may push, as discussed more fully below. In addition, the mounting block 40 controls the orientation of the piezoelectric blocks, as discussed below.

In accordance with one aspect of the present invention, a pre-load mechanism 50 is operatively disposed between the housing 30 and the mounting block 40 to apply a predetermined amount of force against the mounting block 40, and thus the separate member 14, or to bias the mounting block 40 towards the separate member 14. The force is applied in a linear direction, indicated by arrow 42, oriented orthogonal to the separate member 14, and the direction of travel 16 of the separate member 14. Applying the force in a linear direction advantageously results in more even wear, and is a significant improvement over prior art motors with non-linear or arcuate movement, or which pivot. In addition, the pre-load mechanism 50 preferably applies more than one force, or the force is split, for a more stable linear movement of the mounting block 40, and to prevent pivoting of the mounting block 40. In addition, the force applied by the pre-load mechanism 50 preferably is relatively low, to reduce wear.

Preferably, the pre-load mechanism 50 advantageously includes a pair of coiled springs 54 and 56 with relatively low spring constants. In addition, the springs 54 and 56 provide a more constant force as the head wears. The lower spring constant of the coiled springs 54 and 56 provide a significant advantage over prior art devices with higher spring constants and inconstant forces. In addition, the springs 54 and 56 are located on opposite sides of the mounting block 40 to provide two forces on opposite sides of the mounting block 40, which provide a more stable linear motion 42 of the mounting block 40. The two springs 54 and 56 provide a significant advantage over prior art devices which utilize a single spring resulting in non-linear or arcuate motion or force, and thus uneven wear.

In addition, the coiled springs 54 and 56 provide a greater displacement range of the mounting block 40. The coiled springs 54 and 56 also reduce the mounting tolerances which decreases the cost of the motor 10.

An indentation 60 is formed in the mounting block 40 for receiving the springs 54 and 56. A pair of rods, posts, or pins 64 and 66 are secured to the mounting block 40 in the indentation 60. The springs 54 and 56 are disposed around the respective pins 64 and 66. The pins 64 and 66 have enlarged heads 70 and 72 to maintain the springs 54 and 56 on the pins 64 and 66. A plate 74 has apertures for receiving the pins 64 and 66 therethrough, such that the plate 74 is movably disposed on the pins 64 and 66. The plate 74 abuts the springs 54 and 56 and the flange 46 of the housing 30, such that the springs 54 and 56 push against the plate 74, and thus the housing 30, and the mounting block 40. Placing the springs 54 and 56 in the aperture of the mounting block 40 advantageously reduces the size of the housing 30, and thus the motor 10. In addition, the pin 64 and 66 and coiled spring 54 and 56 configuration allows for different springs with different spring constants to be interchanged to achieve a desired pre-load force.

A head or engaging element 80 is coupled to the mounting block 40 and housing 30, and thus the fixed object (such as the base 22 of the slide 18 in FIG. 4), and movably engages the separate member 14. The head 80 has opposite first and second surfaces 82 and 84.

A pair of piezoelectric blocks 90 and 92 are affixed to the mounting block 40 and coupled to the head 80. Each piezoelectric block 90 and 92 has opposite first and second surfaces 94 and 95, with the first surface 94 attached to the first surface 82 of the head 80, and the second surface 95 affixed to the mounting block 40. The mounting block 40 has an indentation 96 formed therein with opposite surfaces or walls 100 and 102 oriented at an angle, such as a 45 degree angle, to the separate member 14, or direction of travel 16 of the separate member 14. A first piezoelectric block 90 is affixed to a first wall 100 of the indentation 96, while a second block 92 is affixed to a second wall 102 of the indentation 96, with the head 80 disposed between the two piezoelectric blocks 90 and 92.

The piezoelectric blocks 90 and 92 are rectangular or square blocks of piezoelectric material, such as a ceramic material, which responds to an applied electric field with dimensional changes. For example, an AC charge applied to the piezoelectric blocks 90 and 92 causes the piezoelectric material to expand and contract in a vibrational manner. It will be appreciated that such expansion and contraction results in displacement of the second surfaces of the blocks 90 and 92, the head 80 attached to the blocks 90 and 92, and thus separate member 14 engaged by the head 80. The electric field or voltage preferably is applied at a resonant frequency of the motor 10, which is preferably about 130 KHz.

The pre-load mechanism 50 applies a force to the head 80, through the mounting block 40 and piezoelectric blocks 90 and 92, to force or bias the head 80 against the separate member 14. Again, as stated above, this force is directed linearly in a direction 42 orthogonal to the separate member 14, as opposed to arcuately or pivotally, to reduce uneven wear. As the piezoelectric blocks 90 and 92 expand and contract, the force applied to the head 80 against the separate member 14 is respectively increased and decreased, and the head 80 displaces respectively towards and away from the separate member 14 partially in the direction of travel. For example, as the first piezoelectric block 90 is operated, displacement of the separate member 14 towards the left results (with respect to FIG. 1). Similarly, as the second piezoelectric block 92 is operated, displacement of the separate member 14 towards the right results (with respect to FIG. 1). It is of course understood that a single piezoelectric block can be utilized for unidirectional movement.

As the piezoelectric blocks 90 and 92 expand and contract, they push and pull against both the head 80 and the mounting block 40. Thus, the mounting block 40 preferably has a large mass. In addition, the mounting block 40 is held against lateral movement by the housing 30. The low friction material 48 also may fill any space between the mounting block 40 and the housing 30 so that the mounting block 40 fits snugly, at least laterally, within the housing 30.

Further details of the operation of piezoelectric motors is disclosed in U.S. Pat. No. 4,622,483, to Staufenberg, Jr. et al, which is herein incorporated by reference.

First and second electrodes 110 and 112 are disposed between the head 80 and respective first and second piezoelectric blocks 90 and 92. The electrodes 110 and 112 apply an electric field, such as an AC charge or voltage, to the piezoelectric blocks 90 and 92. First and second wires 120 and 122 are coupled to respective first and second electrodes 110 and 112 to carry electrical signals to the electrodes 110 and 112. As stated above, the housing 30 and mounting block 40 are preferably metal, or another conductive material, so that a ground wire 128 may be coupled to the housing 30, and thus the piezoelectric blocks 90 and 92. Thus, each piezoelectric block 90 and 92 has one end coupled to the electrodes 110 and 112 and wires 120 and 122, and another end coupled to the ground wire 128 through the mounting block 40 and housing 30. The electrical signals or the applied electric field may be controlled to selectively operate the piezoelectric blocks 90 and 92, and thus selectively control the displacement of the separate member 14, such as direction, speed, distance, etc.

Figure 3:
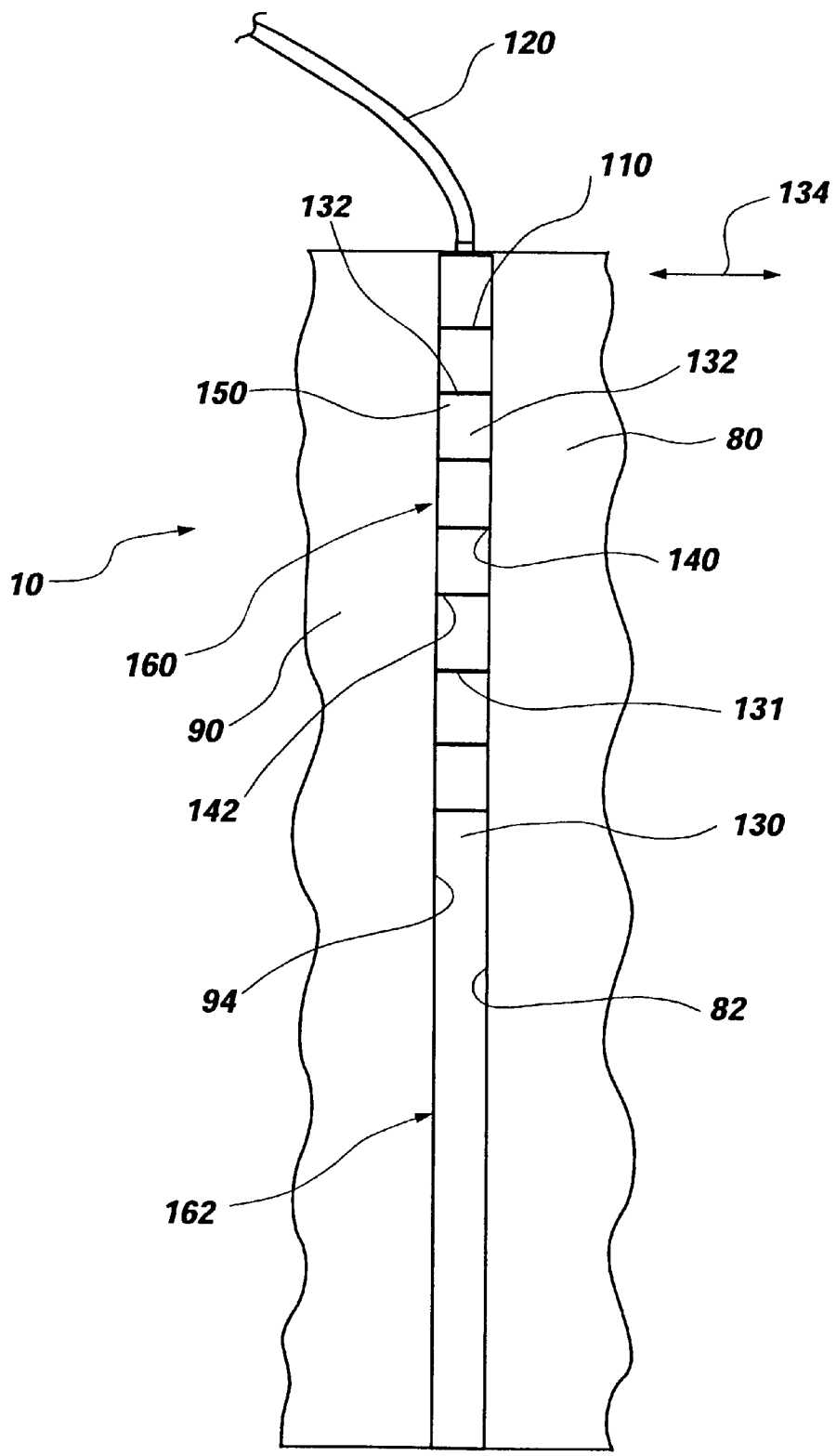
FIG. 3 is a detailed partial view of a joint or interface between a head and piezoelectric block in accordance with the present invention.

Referring to FIG. 3, a joint or interface 130 between one of the piezoelectric blocks 90 and the head 80 is shown, which is exemplary of both first and second joints or interfaces 130 and 132 between the head 80 and the respective first and second piezoelectric blocks 90 and 92. The electrode 110 is disposed between the piezoelectric block 90 and the head 80. The electrode 110 may be attached to the head 80 by an adhesive, as discussed in greater detail below.

In accordance with another aspect of the present invention, the electrode 110 advantageously is a mesh material 131 which extends between the piezoelectric block 90 and the head 80 to form a rigid structure 132 which displaces, indicated by arrow 134, as the piezoelectric block 90 expands and contracts. Thus, the expansion and contraction of the piezoelectric block 90 is transferred to the head 80. The electrode 110 has opposite surfaces including a first surface 140 which preferably substantially contacts the first surface 82 of the head 80, and a second surface 142 which preferably substantially contacts the first surface 94 of the piezoelectric block 90. Thus, the electrode 110 preferably directly contacts both the head 80 and the piezoelectric block 90 to provide stiffness, and increase efficiency. Such direct contact of the electrode 110 is a significant improvement over prior art motors in which the electrode, or head and piezoelectric material, float on a layer of epoxy.

In addition, the electrode 110 has a plurality of apertures or perforations 150 formed therethrough creating spaces 152 between the piezoelectric block 90 and the head 80. An adhesive is disposed in the spaces 152 of the electrode 90 to adhere the head 80 to the piezoelectric block 90. Thus, the adhesive may bond to the surfaces 82 and 94 of the head 80 and piezoelectric block 90, without interfering with the contact between the electrode surfaces 140 and 142. Therefore, the apertures 150 in the electrode 110 advantageously allow the electrode 110 to be disposed between the head 80 and the piezoelectric block 90, and the head 80 to be adhered to the piezoelectric block 90, while the electrode 110 forms the solid structure 132 between the head 80 and piezoelectric block 90. The head 80 and piezoelectric block 90 are spaced-apart by the interface 130 a distance defined by the thickness of the electrode 110. Thus, the electrode 110 also serves to control the bond thickness which results in more consistent performance. It is believed that the direct contact and lack of epoxy layers results in a stiffer and more efficient motor. The uniform and consistent bond thickness, and direct contact of the electrode 110, are significant improvements over prior art motors with inconsistent bonds.

In accordance with another aspect of the present invention, the interface 130 advantageously has two zones, including a first rigid zone 160 and a second compliant zone 162, which is more compliant or flexible than the rigid zone 160. Each of the zones 160 and 162 comprises part of the interface 130 between the piezoelectric block 90 and the head 80. The rigid zone 160 is more rigid than the compliant zone 162 and displaces as the piezoelectric block 90 expands to transfer the expansion to the head 80. The compliant zone 162 complies or flexes as the opposite, or second, piezoelectric block 92 expands. It will be appreciated that the piezoelectric blocks 90 and 92 are disposed on opposite sides of the head 80, and thus expand partially against one another. Thus, the compliant zone 162 allows the head 80 to move somewhat with respect to one piezoelectric block 90 while the opposite piezoelectric block 92 expands.

The rigid zone 160 may be formed by the electrode 90 extending between the head 80 and piezoelectric block 90 in the interface 130. The rigid and compliant zones 160 and 162 preferably each form a half of the interface 130. Thus, the electrode 90 preferably extends partially, or half way, into the interface 130.

Although it is believed that stiffening the motor 10 through control of the bond joint or interface 130, and direct contact between the electrode 110 and the head 80 and piezoelectric block 90, results in greater efficiency, it is also believed that such stiffness also results in high stress points and premature failure of the motor 10. Thus, the compliant zone 162 is located at areas believed to be high stress areas of the interface 130, or at the inside corners of the joints. It is believed that the compliant zone 162, or layer of adhesive, allows for stress and strain relief during motor operation, resulting in increased efficiency and longer life. In addition, stiffening of the motor 10 resulted in higher resonant frequencies, beyond the desired resonant frequency of approximately 130 KHz. The addition of the compliant zone 162 resulted in reduction in resonant frequency of the stiffer motor back to the desired range of about 130 KHz.

The above described piezoelectric motor 10 resulted in an increase in displacement rate of the separate member 14 from about 4 in/sec with an applied voltage of 60 V (peak-to-peak), to approximately 10 in/sec at 50 V (peak-to-peak). Thus, the improved piezoelectric motor 10 requires less energy and results in much greater displacement. In addition, the improved piezoelectric motor 10 has been found to have an increase in service life up to three times.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A piezoelectric motor configured to drive a separate member, the motor comprising:
    a) a head configured to movably engage the separate member;
    b) at least one piezoelectric block, coupled to the head, and configured to selectively expand and contract in response to an applied electric field to displace the head and the separate member;
    c) an electrode, extending between the head and the at least one piezoelectric block, and configured to apply the electric field to the at least one piezoelectric block;
    d) at least one aperture formed in the electrode to create a space between the head and the at least one piezoelectric block; and
    e) an adhesive, disposed in the space of the electrode between the head and the piezoelectric block, to join the head and the piezoelectric block.

2. A motor in accordance with claim 1, wherein the electrode forms a rigid structure configured to displace as the piezoelectric block expands and contracts, and to transfer the expansion and contraction of the piezoelectric block to the head.

3. A motor in accordance with claim 1, wherein the electrode includes a mesh material with a plurality of openings.

4. A motor in accordance with claim 1, wherein the head and the piezoelectric block have opposing surfaces, and wherein the electrode has opposite surfaces, each of the surfaces of the electrode contacting one of the surfaces of the head and the piezoelectric block.

5. A motor in accordance with claim 1, wherein the electrode has a thickness, and wherein the head and the piezoelectric block are spaced-apart a distance defined by the thickness of the electrode.

6. A motor in accordance with claim 1, further comprising:
    a) a housing, configured to be fixed with respect to the separate member;
    a) a mounting block, movably connected to the housing and affixed to the piezoelectric block.

7. A motor in accordance with claim 6, further comprising:
    a pair of coiled springs, each disposed between the housing and the mounting block, on opposite sides of the head, and configured to apply a force to the mounting block, piezoelectric block, and head, in a linear direction oriented perpendicular to the separate member to force the head against the separate member.

8. A motor in accordance with claim 1, further comprising:
    a) a second piezoelectric block, coupled to the head, and configured to selectively expand and contract in response to an applied electric field to displace the head, and thus the separate member; and
    b) a second electrode, extending between the head and the second piezoelectric block, and configured to apply the electric field to the second piezoelectric block; and
    c) wherein the piezoelectric blocks are configured to displace the separate member in opposite directions.

9. A motor in accordance with claim 1, further comprising:
    an interface, formed between the head and the piezoelectric block; and
    wherein the electrode extends through only a portion of the interface forming a rigid portion; and
    further comprising:
    an adhesive, disposed between another portion of the head and the piezoelectric block, which is more compliant than the electrode forming a compliant portion.

10. A piezoelectric motor configured to drive a separate member, the motor comprising:
    a) a head configured to movably engage the separate member;
    b) at least one piezoelectric block, coupled to the head, and configured to selectively expand and contract in response to an applied electric field to displace the head;
    c) a joint, formed between the head and the at least one piezoelectric block;
    d) an electrode, disposed in the joint and between the head and the at least one piezoelectric block, and configured to apply the electric field to the at least one piezoelectric block; and e) an adhesive, disposed in the joint of the electrode between the head and the piezoelectric block, to join the head and the piezoelectric block; and f) the electrode extending only through a portion of the joint, and the adhesive extending through at least another portion of the joint.

11. A motor in accordance with claim 10, wherein the head and the at least one piezoelectric block have joint surfaces forming the joint, the joint surfaces each having a surface area; and wherein the electrode has electrode surfaces each having a surface area less than the surface area of the joint surfaces of the head and the piezoelectric block.

12. A motor in accordance with claim 10, wherein the electrode extends through only half of the joint.

13. A motor in accordance with claim 10, wherein the joint comprises at least two zones, including (i) a first rigid zone in which the electrode is disposed, the electrode forming a rigid structure configured to displace as the piezoelectric block expands, and to transfer the expansion of the piezoelectric block to the head, and (ii) a second compliant zone which is free of the electrode, and in which the head may move towards the piezoelectric block.

14. A motor in accordance with claim 10, wherein the joint forms an interface between the head and the piezoelectric block, the interface having a rigid portion formed by the electrode, and a compliant portion formed by an adhesive which is more flexible than the electrode.

15. A motor in accordance with claim 10, further comprising:

a) a second piezoelectric block, coupled to the head, and configured to selectively expand and contract in response to an applied electric field to displace the head, and thus the separate member;

b) a second joint, formed between the head and the second piezoelectric block; and c) a second electrode, extending between the head and the second piezoelectric block, and configured to apply the electric field to the second piezoelectric block, the second electrode extending only partially through the second joint; and d) wherein the piezoelectric blocks are configured to displace the separate member in opposite directions.

16. A motor in accordance with claim 15, wherein the joints have rigid portions formed by the electrodes and compliant portions, the compliant portion of one joint being configured to comply as the other piezoelectric block expands and contracts.

17. A motor in accordance with claim 10, wherein the electrode includes a mesh material with a plurality of openings.

18. A motor in accordance with claim 10, further comprising:

a) a housing, configured to be fixed with respect to the separate member; and b) a mounting block, movably connected to the housing and affixed to the piezoelectric block.

19. A motor in accordance with claim 18, further comprising:

a pair of coiled springs, each disposed between the housing and the mounting block, on opposite sides of the head, and configured to apply a force to the mounting block, piezoelectric block, and head, in a linear direction oriented perpendicular to the separate member to force the head against the separate member.

20. A piezoelectric motor configured to drive a separate member, the motor comprising:

a) a head configured to movably engage the separate member; and b) at least one piezoelectric block, coupled to the head, and configured to selectively expand and contract in response to an applied electric field to displace the head, and thus the separate member;

c) an electrode, disposed between the head and the at least one piezoelectric block, and configured to apply the electric field to the at least one piezoelectric block;

d) a housing, configured to remain fixed with respect to the separate member;

e) a mounting block, movably coupled to the housing and affixed to the at least one piezoelectric block, the mounting block having an indentation formed therein; and f) a pre-load mechanism, disposed in the indentation of the mounting block and between the housing and the mounting block, and configured to apply a force to the mounting block, piezoelectric block, and head, in a linear direction oriented perpendicular to the separate member to force the head against the separate member.

21. A motor in accordance with claim 20, wherein the pre-load mechanism includes a pair of coiled springs, each disposed between the housing and the mounting block, on opposite sides of the head.

22. A motor in accordance with claim 20, further comprising:

a) a second piezoelectric block, coupled to the head, and configured to selectively expand and contract in response to an applied electric field to displace the head, and thus the separate member; and b) a second electrode, extending between the head and the second piezoelectric block, and configured to apply the electric field to the second piezoelectric block; and c) wherein the piezoelectric blocks are configured to displace the separate member in opposite directions.

23. A motor in accordance with claim 20, further comprising:

a) at least one aperture formed in the electrode to create a space between the head and the at least one piezoelectric block; and b) an adhesive, disposed in the space of the electrode between the head and the piezoelectric block, to join the head and the piezoelectric block.

24. A motor in accordance with claim 23, wherein the electrode includes a mesh material with a plurality of openings.

25. A motor in accordance with claim 20, further comprising:

an interface, formed between the head and the piezoelectric block; and wherein the electrode extends through only a portion of the interface forming a rigid portion; and further comprising:

an adhesive, disposed between another portion of the head and the piezoelectric block, which is more compliant than the electrode.

26. A piezoelectric motor configured to drive a separate member, the motor comprising:

a) a head configured to movably engage the separate member;

b) first and second piezoelectric blocks, each coupled at opposite sides of the head, and configured to selectively expand and contract in response to an applied electric field to displace the head, and thus the separate member, in respective first and second directions;

c) first and second interfaces, formed between the head and the respective first and second piezoelectric blocks, each having at least two zones, including (i) a first rigid zone configured to displace as the corresponding piezoelectric block expands, and to transfer the expansion of the corresponding piezoelectric block to the head, and (ii) a second compliant zone configured to comply as the opposite piezoelectric block expands; and d) first and second electrodes, disposed in the respective first and second interfaces, and configured to apply the electric field to the respective first and second piezoelectric blocks.

27. A motor in accordance with claim 26, wherein the first and second electrodes are disposed only in the first rigid zones of the respective first and second interfaces; and wherein the electrodes form rigid structures configured to displace as the piezoelectric blocks expand and contract, and to transfer the expansion and contraction of the piezoelectric blocks to the head.

28. A motor in accordance with claim 26, further comprising:

an adhesive, disposed in the second compliant zones of the first and second interfaces, which is more flexible than the electrode.

29. A motor in accordance with claim 26, further comprising:

a) at least one aperture, formed in each of the first and second electrodes, to create a space between the head and the first and second piezoelectric blocks; and b) an adhesive, disposed in the space of each of the first and second electrodes.

30. A motor in accordance with claim 26, wherein the first and second electrodes include a mesh material with a plurality of apertures.

31. A motor in accordance with claim 26, further comprising:

a) a housing, configured to be fixed with respect to the separate member; and b) a mounting block, movably connected to the housing and affixed to the piezoelectric block.

32. A motor in accordance with claim 31, further comprising:

a pair of coiled springs, each disposed between the housing and the mounting block, on opposite sides of the head, and configured to apply a force to the mounting block, piezoelectric block, and head, in a linear direction oriented perpendicular to the separate member to force the head against the separate member.

* * * * *